UNITED STATES PATENT OFFICE.

ALEXANDER W. HARRINGTON, OF BROOKLYN, NEW YORK, ASSIGNOR, BY MESNE ASSIGNMENTS, TO THE A. W. HARRINGTON COMPANY, A CORPORATION OF NEW YORK.

SIZE FOR PAPER-MAKERS.

960,318.  Specification of Letters Patent.  Patented June 7, 1910.

No Drawing. Application filed January 5, 1907, Serial No. 350,926. Renewed October 2, 1909. Serial No. 520,679.

*To all whom it may concern:*

Be it known that I, ALEXANDER W. HARRINGTON, a citizen of the United States, and a resident of Brooklyn, Kings county, New York, have invented certain new and useful Improvements in Size for Paper-Makers; and in order that others skilled in the art may make and use the same I give the following description and specification.

My invention relates to sizing material for use by paper-makers in the manufacture of paper, paper-board, etc., and it has for its object to produce a size having superior quality, which not only sizes paper and paper products in the ordinary manner, but which also imparts strength and hardness to the paper, and improves the color and finish.

The size is made up of the following ingredients or their equivalents, to wit: rosin, soda ash, glue, formaldehyde, glycerin, starchy material, preferably cassava, and a natural oil, such as Russian oil.

In order to prepare the size according to my invention, the ingredients are mixed together and in substantially the proportions as follows, according to the quantity desired: 100 pounds of rosin are boiled together with 12 pounds of soda ash in water; to the soapy mass so produced, after the same has cooled to about 180° F. or below, are added 20 pounds of glue; 2 pounds of cassava are brought to a boiling temperature with water, and added to the mass, and the same is well stirred. When the mass is nearly cooled, the formaldehyde, glycerin and oil are added each in quantity varying from 1½ to 5% by weight of the mass. The amount of glycerin, formaldehyde and oil will vary according to the degree of hardness finish or other characteristics it is desired to impart to the paper. Water is added to bring the mass to about the consistency of a soft soap.

The size is applied in a manner well known to and understood by paper-makers.

Various changes in the ingredients and in the proportions specified may be made without departing from the scope of the invention.

Having described my invention in the manner of preparing and using the same, what I claim and desire to protect by Letters Patent is:

1. A size composed of rosin soap, glue, formaldehyde, glycerin, starchy material and oil.

2. A size composed of rosin-soap, glue, formaldehyde, glycerin, cassava and Russian oil.

3. The hereindescribed process of making a size, which consists in boiling together in water rosin and soda ash, allowing to cool to about 180° F., adding glue, boiling starchy material in water and adding the same to the mass containing the rosin, soda ash and glue, allowing the mass to cool and adding thereto glycerin, formaldehyde and Russian oil.

4. The hereindescribed composition for a size, which consists in the following ingredients in substantially the proportions specified, viz., rosin 100 pounds, soda ash, 12 pounds, glue 20 pounds, cassava 2 pounds and formaldehyde, glycerin and Russian oil each in substantially the proportions by weight of from 1½ to 5% of the total of the other ingredients specified.

ALEXANDER W. HARRINGTON.

Witnesses:
WM. P. HAMMOND,
H. C. WORKMAN.